United States Patent
Lee

(12) 
(10) Patent No.: US 6,349,864 B1
(45) Date of Patent: Feb. 26, 2002

(54) MECHANICAL ARRANGEMENT FOR PROMOTING PORTABLE COMPUTER'S ADAPTABILITY TO APPLICATION

(76) Inventor: Hsin-Kuo Lee, 7F-2, No. 1, Lane 265, Sec. 2, Tung Hwa S. Rd., Taipei, 106 (TW)

( * ) Notice: Subject to any disclaimer, the term of this patent is extended or adjusted under 35 U.S.C. 154(b) by 0 days.

(21) Appl. No.: 09/472,129

(22) Filed: Dec. 23, 1999

(51) Int. Cl.$^7$ .................................................. A45F 5/00
(52) U.S. Cl. ...................... 224/270; 224/257; 224/265; 224/271
(58) Field of Search ................................ 224/270, 271, 224/257, 265, 258, 259, 260

(56) References Cited

U.S. PATENT DOCUMENTS

| | | | | |
|---|---|---|---|---|
| 5,667,114 A | * | 9/1997 | Bourque | 224/270 |
| 5,724,225 A | * | 3/1998 | Hrusoff et al. | 224/270 X |
| 5,938,096 A | * | 8/1999 | Sauer et al. | 224/270 X |
| 6,006,970 A | * | 12/1999 | Piatt | 224/270 X |

* cited by examiner

Primary Examiner—Stephen K. Cronin
Assistant Examiner—Maerena W. Brevard
(74) Attorney, Agent, or Firm—Lowe Hauptman Gilman & Berner, LLP

(57) ABSTRACT

The present invention relates to an arrangement for adapting a portable computer or notebook computer to an environment or an application in which no object is available for supporting the portable computer or notebook computer for a user to use. It is featured by comprising: a hanging unit to be coupled to the portable computer (may be or not be a notebook computer) and hanged on the part of a user' body which is above the shoulder of the user; and a propping unit for separating the portable computer from a part of the user's body which is under the shoulder of the user.

9 Claims, 3 Drawing Sheets

MECHANICAL ARRANGEMENT FOR PROMOTING PORTABLE COMPUTER'S ADAPTABILITY TO APPLICATION

FIELD OF THE INVENTION

The present invention relates to an arrangement for adapting a portable computer or notebook computer to an environment or an application in which no object is available for supporting the portable computer or notebook computer for a user to use.

BACKGROUND OF THE INVENTION

A conventional portable computer or notebook computer is easily carried, but hardly operated by a user if it is not supported by an object such as a desk. Shown in FIG. 1 is a man sitting and operating a notebook computer or portable computer placed on his lap, from which we can see that the man must maintain his lap in a certain position, resulting in his uneasiness. Also we can realize the high likelihood of dropping of the notebook computer or portable computer to ground resulting from the man's careless changing of gesture or reaction to environment, or from the others' careless movement. Obviously it is even impractical for a standing person to use a portable computer or notebook computer. It can be understood now why an arrangement for adapting a portable computer or notebook computer to an environment or application in which no object is available for supporting the portable computer or notebook computer is so important.

SUMMARY OF THE INVENTION

It is therefore a primary object of the present invention to provide an arrangement for adapting a portable computer or notebook computer to an environment or application in which no object is available for supporting the portable computer or notebook computer for a user to use.

Another object of the present invention is to provide an arrangement or apparatus for people to use a portable computer or notebook computer when traveling or taking dynamic activities such as taking a plane, waiting for a plane, or standing for a duty requiring continuous operation of a portable computer or notebook computer.

The other object of the present invention is to provide an arrangement or apparatus to carry a portable computer or notebook computer adapted for being used by the people traveling or taking dynamic activities such as taking a plane, waiting for a plane, or standing for a mission requiring continuous operation of a portable computer or notebook computer.

The introduction to an application of a portable computer or notebook computer based on the present invention can be best understood by referring to FIG. 2, FIG. 3, and FIG. 9, in which a belt 20 hanged over a man's neck is coupled to a portable computer comprising a main part 18 and a screen part 19, or coupled to a structure accommodating the portable computer comprising main part 18 and screen part 19, and a propping unit 10 comprising parts 11(not necessarily shown in each figure), 12(not shown), and 13 separates the portable computer from the man's chest or abdominal region, thereby the man can conveniently operate the portable computer.

One representation of the present invention is featured by comprising: a hanging unit to be coupled to the portable computer (may be or not be a notebook computer) and hanged on the part of a user' body which is above the shoulder of the user; and a propping unit for separating the portable computer from a part of the user's body which is under the shoulder of the user. The propping unit, for example, may be a mechanical structure with one side contacting or connecting the portable computer while with an opposite side contacting the user's body, and the hanging unit, for example, may be a belt to be rounded over the user's neck and having its two ends coupled to the portable computer through the connection with the propping unit if the propping unit has been adequately connected with the portable computer, or having its two ends directly connected to two sides of the portable computer. The hanging unit may also be a belt with one circle at its end rounding the proper part of the user's head and another circle at opposite end rounding the portable computer or coupled to the portable computer. Another representation of the present invention is featured by comprising: a plate for accommodating or connecting a portable computer; a propping unit for separating the plate from a user's body which is under the shoulder of the user; and a hanging unit to be connected with the plate and hanged on a part of the user's body which is above the shoulder of the user. If the propping unit has been adequately connected with the plate, the hanging unit may be coupled, instead of being directly connected, to the plate through its connection with the propping unit. The other representation of the present invention is featured by comprising: a seating unit for accommodating a portable computer thereon and being adjustable to adapt to the size of the portable computer; a propping unit for separating the seating unit from the part of the user's body which is under the shoulder of the user; and a hanging unit to be coupled to the seating unit and hanged on the part of the user's body which is above the shoulder of the user. The hanging unit is not necessarily directly connected to the seating unit, instead it may be coupled to the seating unit through its connection with the propping unit if the propping unit has been adequately connected with the seating unit.

The present invention may best be understood through the following description for preferred embodiments with reference to the accompanying drawings, in which:

DETAILED DESCRIPTION OF THE PREFERRED EMBODIMENTS

Figure 1:
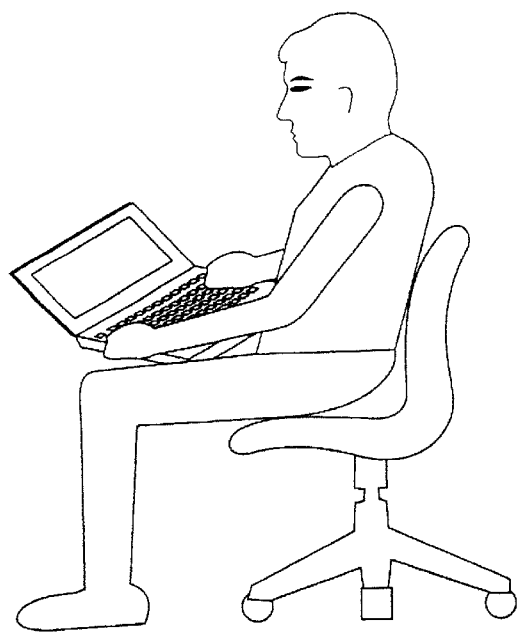
FIG. 1 shows a man sitting and operating a notebook computer or portable computer placed on his lap.
Figure 2:
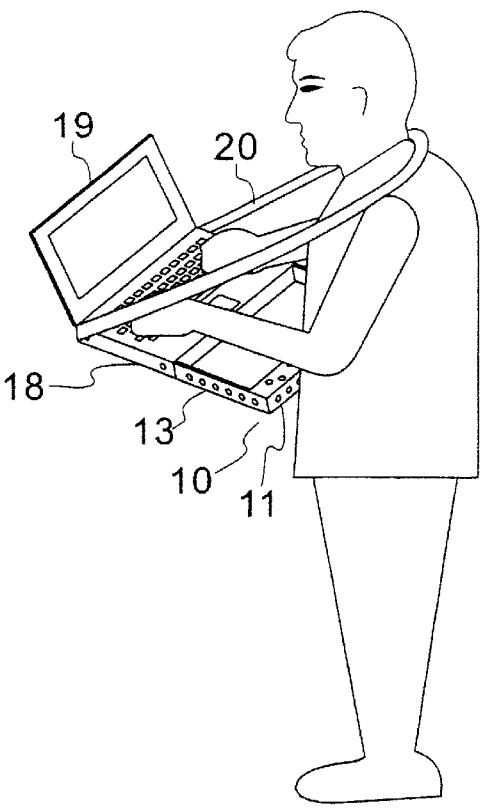
FIG. 2 shows a man standing and operating a notebook computer or portable computer adapted by one aspect of the present invention.
Figure 3:
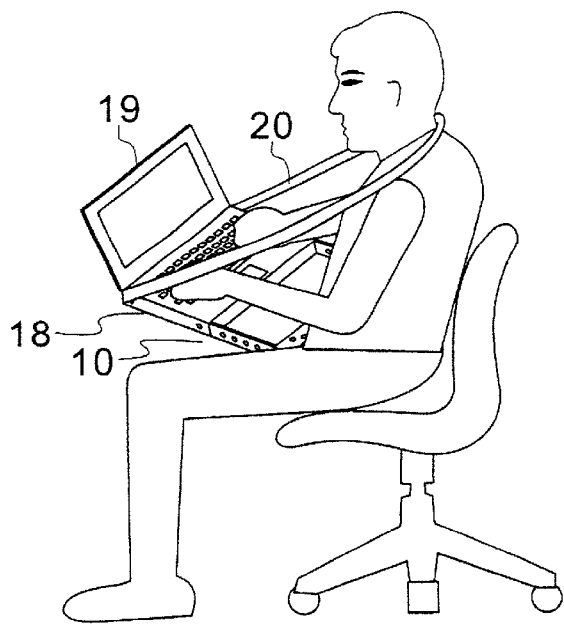
FIG. 3 shows a man sitting and operating a notebook computer or portable computer placed on his lap and adapted by one aspect of the present invention.
Figure 4:
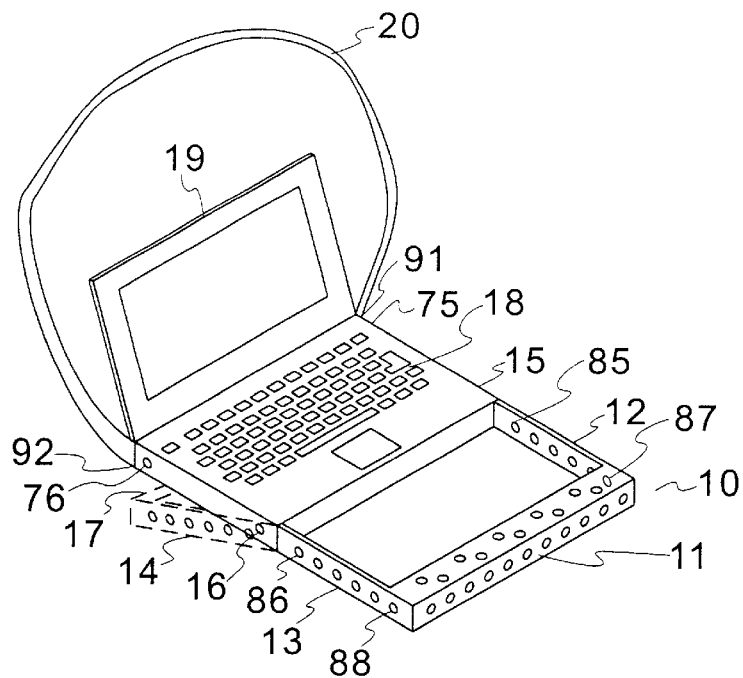
FIG. 4 shows a structure of an embodiment based on one representation of the present invention.
Figure 9:
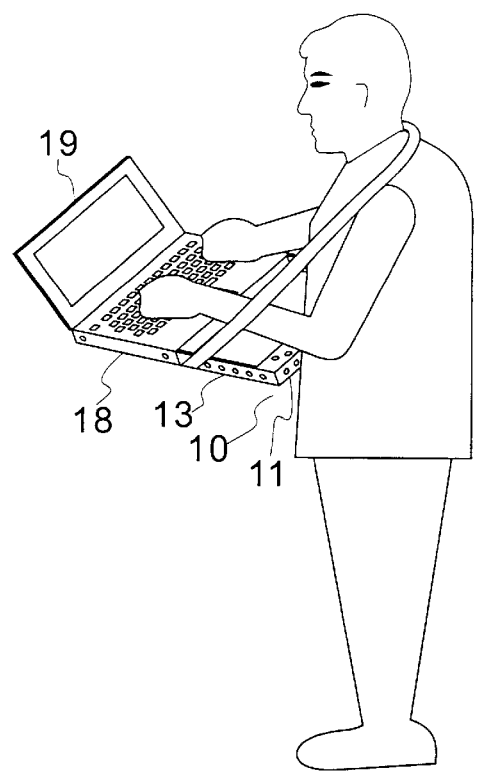
FIG. 9 shows an embodiment of coupling a hanging unit to a portable computer or a structure accommodating a portable computer through a propping unit adequately connected with the portable computer or the structure accommodating the portable computer.

Shown in FIG. 4 is an embodiment of an arrangement according to the present invention for adapting a portable computer to an environment without an object supporting the portable computer for a user to use the portable computer. The portable computer comprises a main part 18 and a screen part 19 which is opened for the user to use the portable computer. The arrangement is configured to include: a propping unit 10 comprising three portions 11, 12, and 13, for separating the portable computer from the user's chest or another part of the user's body which is under the shoulder of the user; and a hanging unit 20 to be hanged on a part of the user's body which is above the shoulder of the user, and to be coupled to the portable computer either by directly connecting the portable computer or, in case portions 12 and 13 of the propping unit have been adequately connected with the portable computer, through connecting some proper sections of portions 12 and 13 of propping unit 28, such as the sections of portions 12 and 13 which are nearby the portable computer, as can be comprehended by referring to FIG. 9. The propping unit 10 has its portions 12 and 13 connected with its portion 11. The portions 12 and 13 of the propping unit 10 can be deemed as supporting portions for supporting the portable computer so that the portable computer is separated from the chest or another part of the body of the user.

The portion 11 of the propping unit 10 is a contacting portion for contacting the body of the user and may be in such a shape that the pressure of the portable computer on the body of the user is uniformly distributed. Obviously the arrangement may be so configured that the propping unit 10 is connected with the portable computer and is adjustable for the user to select a distance between the portable computer and the user's body. For example, supporting portions 12 and 13 of the propping unit are movable relative to the portable computer to be connected with at least one buttoning point selected from among a plurality of different points such as points 15, 16, 75, and 76 of the portable computer, or movable relative to the portable computer with at least one point selected from among a plurality of different points such as points 85, 86, 87, and 88 thereof connective to at least one buttoning point such as points 15 and/or 16 of the portable computer.

If the propping unit 10 is configured to be so movable that its portion 11 can closely contact the main part 18 of the portable computer when pushed toward the portable computer, it can be integrated, in case it is not in use, together with the portable computer to realize the convenience of carrying it together with the portable computer. The arrangement may also be so configured that the portions 12 and 13 of the propping unit 10 are supporting portions for connecting the contacting portion 11 and at least a hinge point such as points 15 and/or 16 of main part 18 of the portable computer, and the supporting portions (portions 12 and 13) are movable relative to the hinge points 15 and/or 16 of the portable computer to be under the portable computer, thereby the supporting portion 12 and 13 sit on the lap of the user to support the portable computer in such a way that the portable computer is tilted for the user to operate conveniently. For example, supporting portions 12 and 13 of the propping unit 10 are so moved that the supporting portion 13 reaches position 14 and the contacting portion 11 reaches the position 17, all under the portable computer.

In the arrangement, the hanging unit 20 is a belt for rounding the neck of the user, with its two ends 91 and 92 connected with two points of the portable computer.

Figure 5:
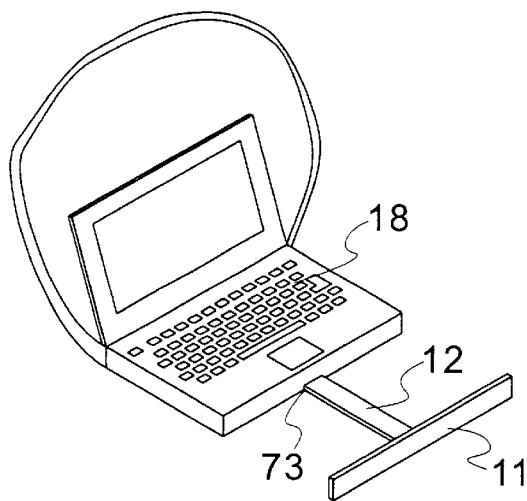
FIG. 5 shows another structure of the propping unit for an embodiment based on the present invention.

Shown in FIG. 5 is another embodiment of an arrangement according to the present invention for adapting a portable computer to an environment without an object supporting the portable computer for a user to use the portable computer. It is similar to the one shown in FIG. 4, with just a difference that the functions of supporting portions 12 and 13 in FIG. 4 are performed by only one supporting portion 12 which connects a buttoning point or a hinge point 73 of the main part 18 of the portable computer.

Figure 6:
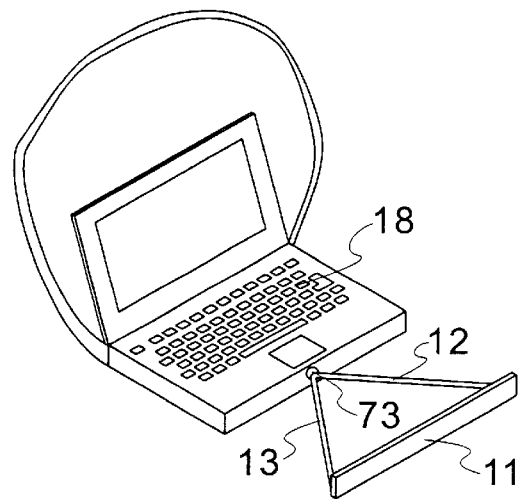
FIG. 6 shows the other structure of the propping unit for an embodiment based on the present invention.

Shown in FIG. 6 is the other embodiment of an arrangement according to the present invention for adapting a portable computer to an environment without an object supporting the portable computer for a user to use the portable computer. It is similar to the one shown in FIG. 4, with just a difference that the supporting portions 12 and 13 in FIG. 4 are connected to only one buttoning point or hinge point 73 of the main part 18 of the portable computer.

Figure 7:
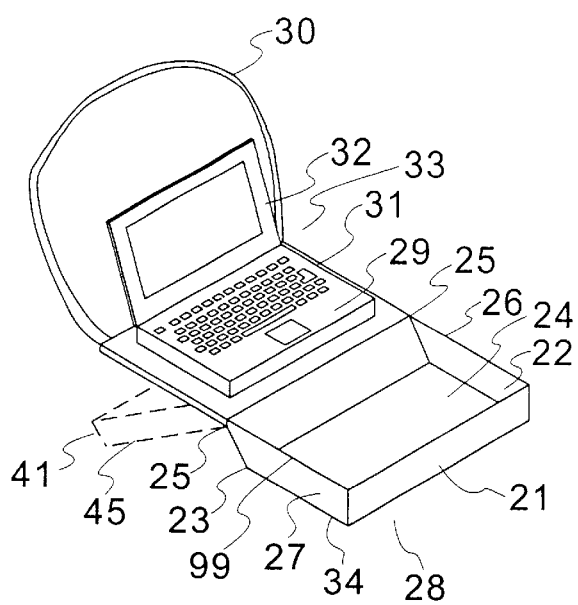
FIG. 7 shows a structure of an embodiment based on another representation of the present invention.

Shown in FIG. 7 is an apparatus for providing a user with convenience to use a portable computer, which comprises:
a plate 31 for accommodating a portable computer including a main part 29 and a screen part 32;
a propping unit 28 for separating the plate 31 from a part of the user's body that is under the shoulder of the user; and
a hanging unit 30 to be hanged on a part of the user's body that is above the shoulder of the user, and to be coupled to the plate 31 either by directly connecting plate 31 or, in case propping unit 28 has been adequately connected with plate 31, through connecting the proper sections of propping unit 28. For example, hanging unit 30 is connected to the sections of propping unit 28 which are nearby the plate 31, as can be comprehended by referring to FIG. 9.

In the apparatus shown in FIG. 7, the propping unit 28 comprises a contacting portion 21 to contact the part of the user's body which is under the shoulder of the user, and a supporting portion which includes a first surface 22, a second surface 27, and a third surface 24 and connects contacting portion 21 and an edge 25 of the plate 31 in order to support the separation between the plate 31 and the contacting portion 21, where the contacting portion 21 is in such a shape that the pressure of the portable computer on the body of the user is uniformly distributed. The edge 25 may function as a hinge edge to be connected by the propping unit 28 in such a way that the propping unit 28 is movable to be under the plate 31, thereby a portable computer accommodated on the plate 31 is titled for the user to conveniently operate. For example, propping unit 28 is so movable that the contacting portion 21 and second surface 27 reach the positions 41 and 45 at the same time. In the apparatus shown in FIG. 7, the propping unit 28 may also connect the hinge edge 25 in such a way that it is movable relative to hinge edge 25 to reach a position right above the portable computer accommodated on the plate 31, thereby the portable computer accommodated on the plate 31 while not being used can be enclosed by the contacting portion 21, the first surface 22, second surface 27, and third surface 24, whereby the portable computer is easily carried and protected. Shown in FIG. 8 is an apparatus for providing a user with convenience to use a portable computer, which comprises:
a seating unit 70 for accommodating a portable computer thereon and being adjustable to adapt to the size of the portable computer accommodated thereon;
a propping unit 50 for separating the seating unit 70 from a part of user's body that is under the shoulder of the user; and
a hanging unit 60 to be hanged on a part of the user's body that is above the shoulder of the user, and to be coupled to the seating unit 70 either by directly connecting seating unit 70 or by connecting propping unit 50 that has been adequately connected with seating unit 70.

Figure 8:
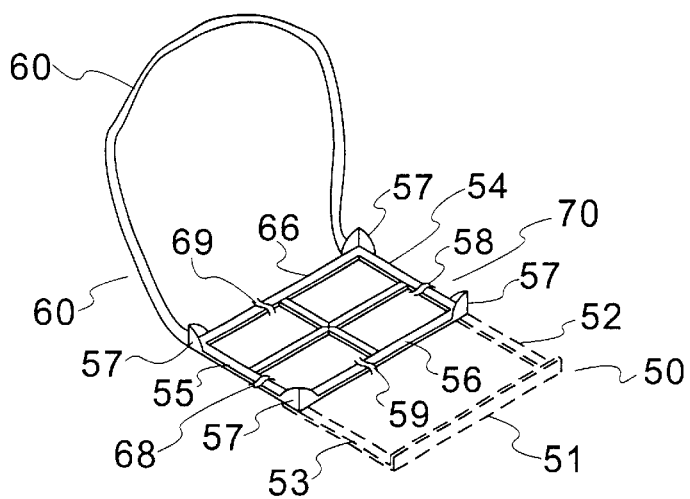
FIG. 8 shows a structure of an embodiment based on the other representation of the present invention.

In the apparatus shown in FIG. 8, the propping unit 50 is configured to be movable for adjusting the distance between the seating unit 70 and the body of the user, and for being integrated together with the seating unit 70 when pushed toward seating unit 70, thereby the apparatus as a whole can be easily carried, particularly when hanging unit 60 rounds over the user's neck and/or shoulder. For example, if the propping unit 50 is so movable and the lengths of portions 52 and 53 thereof are such that the portion 51 thereof can closely contact the seating unit 70, the seating unit 70 and propping unit 50 as a whole can be easily carried with the use of hanging unit 60.

In the apparatus shown in FIG. 8, the seating unit 70 may also be configured to comprise at least two fixing units 57 for fixing the opposite corners of the portable computer accommodated thereon, and/or four edges 54, 55, 56, and 66 with lengths thereof adjustable to adapt to the size of the portable computer accommodated thereon. The seating unit 70 may further be configured to comprise an additional mechanism which is supported by structures 58, 59, 68, 69 for easily realizing the adaptability of the seating unit 70 to the size of the portable computer to be accommodated thereon.

While the invention has been described in terms of what are presently considered to be the most practical and preferred embodiments, it shall be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An arrangement for adapting a portable computer for a user's operation, comprising:
   a propping unit for separating said portable computer from a part of the body of said user which is under the shoulder of said user, said propping unit being movable relative to said portable computer to be connected with at least one point selected from among a plurality of different points on said portable computer; and
   a hanging unit coupled to said portable computer and hanged on a part of the body of said user which is above the shoulder of said user.

2. The arrangement according to claim 1 wherein said propping unit comprises a contacting portion to contact the body of said user, said contacting portion being in such a shape that the pressure of said portable computer on the body of said user is uniformly distributed.

3. The arrangement according to claim 1 wherein said hanging unit is coupled to said portable computer through connecting said propping unit.

4. The arrangement according to claim 1 wherein said propping unit is adjustable for said user to select a distance between said portable computer and the body of said user.

5. The arrangement according to claim 1 wherein said propping unit includes at least one point connective to said portable computer.

6. The arrangement according to claim 1 wherein said propping unit is movable to be integrated together with said portable computer for said arrangement to be carried together with said portable computer.

7. The arrangement according to claim 1 wherein said propping unit comprises a contacting portion to contact said user's body, and a supporting portion for connecting said contacting portion and at least a buttoning point of said portable computer, said supporting portion being movable relative to said portable computer with at least one point selected from among a plurality of different points thereof connective to the buttoning point of said portable computer.

8. The arrangement according to claim 1 wherein said propping unit comprises a contacting portion to contact said user's body, and a supporting portion connecting said contacting portion and at least a hinge point of said portable computer, said supporting portion being movable relative to the hinge point of said portable computer to be under said portable computer, thereby said supporting portion sits on the lap of said user to support said portable computer in such a way that said portable computer is tilted for said user to operate conveniently.

9. The arrangement according to claim 1 wherein said hanging unit is a belt for rounding over the neck of said user and connecting two points of said portable computer.

* * * * *